US006708625B1

(12) United States Patent
Burke et al.

(10) Patent No.: US 6,708,625 B1
(45) Date of Patent: Mar. 23, 2004

(54) GREASELESS DOOR LOCK

(75) Inventors: Michael K. Burke, Wheaton, IL (US); John D. Anderson, Aurora, IL (US); Walter J. Peach, Aurora, IL (US)

(73) Assignee: ZefTek, Inc., Montgomery, IL (US)

( * ) Notice: Subject to any disclaimer, the term of this patent is extended or adjusted under 35 U.S.C. 154(b) by 0 days.

(21) Appl. No.: 09/606,735

(22) Filed: Jun. 29, 2000

Related U.S. Application Data

(60) Provisional application No. 60/142,223, filed on Jul. 2, 1999.

(51) Int. Cl.[7] .............................. B61D 3/00; E05C 1/02; F16C 33/20

(52) U.S. Cl. ........................ 105/355; 292/137; 292/168; 384/273; 384/296; 384/299

(58) Field of Search ................................. 292/177, 171, 292/166, 168, DIG. 32, 137; 384/296, 299, 282, 295, 275, 300, 301, 273, 29

(56) References Cited

U.S. PATENT DOCUMENTS 3,193,335 A * 7/1965 Wing
3,874,752 A * 4/1975 Imazaike .................... 384/296
3,912,312 A * 10/1975 Cerutti ........................ 292/218
3,995,563 A 12/1976 Blunden
4,778,205 A * 10/1988 Sayre .......................... 292/171
4,909,638 A * 3/1990 Muto .......................... 384/273
4,917,021 A 4/1990 Murphy
5,020,425 A * 6/1991 Kelly .......................... 98/2.18
5,072,880 A * 12/1991 McCloud .................. 273/85 D
5,092,017 A * 3/1992 Hatano et al. ................. 16/277
5,145,265 A * 9/1992 Flem .......................... 384/296
5,482,987 A * 1/1996 Forschirm ................... 524/230
5,520,466 A * 5/1996 Everitt ........................ 384/294
5,829,317 A * 11/1998 Vreeken et al. ............... 74/560
5,851,021 A * 12/1998 Van Kley ................ 280/438.1
6,086,327 A * 7/2000 Mack et al. ................ 415/160

* cited by examiner

*Primary Examiner*—Anne Marie Boehler
(74) *Attorney, Agent, or Firm*—Bell, Boyd & Lloyd LLC

(57) ABSTRACT

A greaseless door lock for doors on railroad cars which eliminates the need to lubricate the door locks. The greaseless door lock includes a C-shaped bracket having a side wall and spaced apart end walls attached to the side wall wherein the end walls include aligned aperatures for slidably receiving a locking pin. The greaseless door lock includes at least one bushing mounted in each aperature to prevent the locking pin from engaging the end walls. Two semi-clyindrical bushings or one cylindrical bushing may be mounted in each aperature.

26 Claims, 11 Drawing Sheets

GREASELESS DOOR LOCK

PRIORITY CLAIM

This application claims the benefit of the U.S. Provisional Application No. 60/142,223, filed Jul. 2, 1999.

DESCRIPTION

This invention relates in general to a greaseless door lock, and more particularly to a greaseless door lock which is mounted on a door of a railroad car to secure the door in an open position or a closed position.

BACKGROUND OF THE INVENTION

The railroad industry employs a variety of railroad cars for transporting products. Many of these cars, such as boxcars or auto rack railroad cars, are enclosed to protect the products or vehicles being transported. Enclosed railroad cars generally include one or more sliding doors to provide access to the interior of the cars. The doors are generally mounted on upper and lower tracks which are attached to the frame of the car. The doors have conventional door locks to maintain the doors in an open position or a closed position. The conventional door locks must be lubricated with a standard lubricant such as grease. The grease attracts particles and other materials, generally creates a dirty environment and causes grease contamination in the interior of the cars.

This problem is especially undesirable in auto rack railroad cars which transport newly manufactured vehicles, including automobiles, vans and trucks. Auto rack railroad cars, known in the railroad industry as auto rack cars, often travel thousands of miles through varying terrain. The typical auto rack car is compartmented, having two or three decks or floors, a frame, two side walls, a roof and a pair of doors at each end of the car. The doors protect the auto rack car from illegal or unauthorized entry and prevent theft or vandalism of the vehicles. The doors also prevent flying objects from entering the car and damaging the vehicles. In transit, the doors are secured in the closed position. When the automobiles are being loaded or unloaded, the doors are secured in the open position. Examples of such doors for auto rack cars are generally illustrated in U.S. Pat. Nos. 3,995,563 and 4,917,021.

Each door in an auto rack car includes at least one door lock having a locking pin which engages a socket attached to the frame of the auto rack car. The grease and dirt builds up on these door locks, creates a dirty environment and causes grease contamination inside the auto rack cars which is highly undesirable for the transport of newly manufactured vehicles because the grease and dirt can damage the finishes of the vehicles. The grease also tends to drip or fall off the door locks onto the floor or door tracks of the auto rack car. Workers step in this grease and then track the grease into the new vehicles. Thus, the grease sometimes damages the interior carpeting in the new vehicles.

The Association of American Railroads ("AAR") requires that the door locks and rollers be lubricated or greased every twelve months or sooner if necessary. The AAR also requires that the date on which the doors and rollers are lubricated be painted on the inside of the auto rack cars for tracking purposes. This requires extensive tracking procedures for this regular maintenance which increases the cost of operating the auto rack cars and decreases the efficiency of the use of the auto rack cars.

Accordingly, there is a need for a door lock for railroad cars, and in particular auto rack cars which does not need to be lubricated on a regular basis.

SUMMARY OF THE INVENTION

The present invention solves the above problems by providing a greaseless door lock for railroad cars and particularly auto rack railroad cars which eliminates the need to use grease or another lubricant to lubricate the door locks. The greaseless door lock of the present invention generally includes a steel C-shaped bracket having a side wall and spaced-apart upper and lower end walls attached to and extending transversely from the side wall. A mounting plate is attached to the bracket. The upper and lower end walls include aligned apertures for slidably receiving a steel locking pin.

The preferred embodiment of the greaseless door lock includes two semi-clyindrical replaceable plastic bushings, bearing members or collars (primarily referred to herein as "bushings") mounted in each aperture to prevent the steel-on-steel contact between the locking pin and the inner edges of the end walls which defines the apertures. The locking pin maintains the bushings on the end walls in the apertures. The bushings are preferably molded from a polymer such as a moly disulfide filled nylon although they could be made from other suitable materials such as manganese, bronze, ceramics, UHMW polyethylene, delrin or urethane. The bushings eliminate the need for a lubricant between the steel locking pin and the steel end walls of the bracket. The greaseless door lock also includes a spring mounted on the locking pin, a washer mounted on the locking pin below the spring and a stop extending transversely though the locking pin below the washer, which co-act to provide the action for the locking pin.

The greaseless door lock may include an alternatively shaped bracket for different positions on the door and a further embodiment of the greaseless door lock of the present invention includes a cylindrical bushing, bearing member or collar maintained in each aperture by a locking clip.

It is therefore an object of the present invention to provide a greaseless door lock for doors on railroad cars.

Another object of the present invention is to provide a greaseless door lock for doors on railroad cars which eliminates the need to lubricate the door locks.

Other objects, features and advantages of the present invention will be apparent from the following detailed disclosure, taken in conjunction with the accompanying sheets of drawings, wherein like reference numerals refer to like parts.

DETAILED DESCRIPTION OF THE INVENTION

Figure 1:
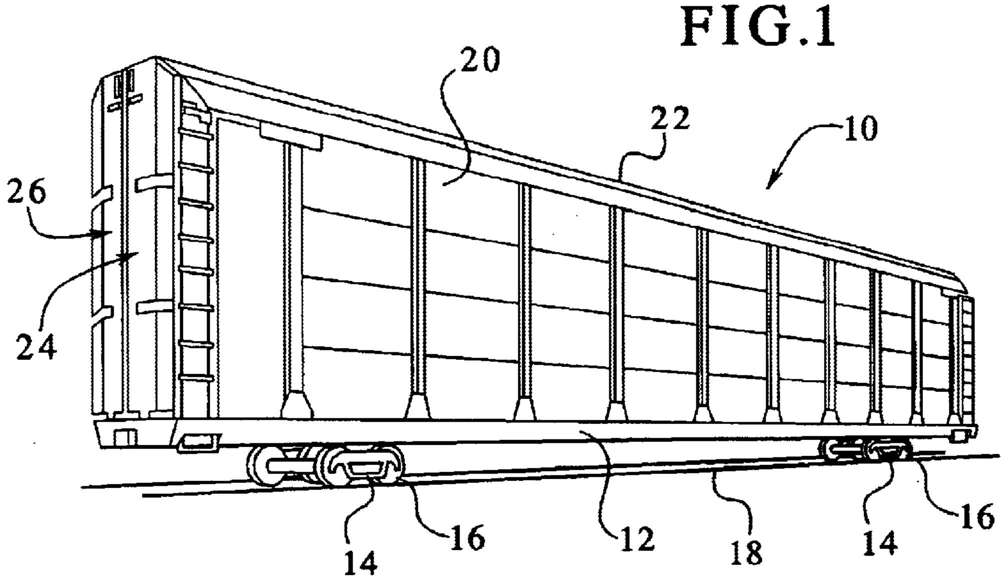
FIG. 1 is a perspective view of an auto rack railroad car.

The greaseless door lock of the present invention eliminates the need to lubricate door locks on doors in enclosed railroad cars. A greaseless door lock of the present invention is described in detail below in relation to auto rack cars, although the present invention is also suited for box cars and other railroad cars.

Referring now to the drawings, and particularly to FIGS. 1 to 8, a typical auto rack car 10 includes a frame 12 supported by trucks 14, each of which have several wheels 16 which roll along railroad tracks 18. The frame 12 supports two side walls 20 and a roof 22. The auto rack car 10 includes a pair of coacting clamshell doors 24 and 26 mounted on each end of the auto rack car 10. The doors 24 and 26 are opened to facilitate the loading and unloading of vehicles into and out of the auto rack car 10 and are closed during transport or storage of the vehicles. The right hand door 24 and the left hand door 26 (when viewed from the outside of the car) are shown in closed position in FIGS. 1, 2, 4 and 5, and the left hand door 26 is shown in open position in FIG. 3 and in closed position in FIG. 6.

Figure 3:
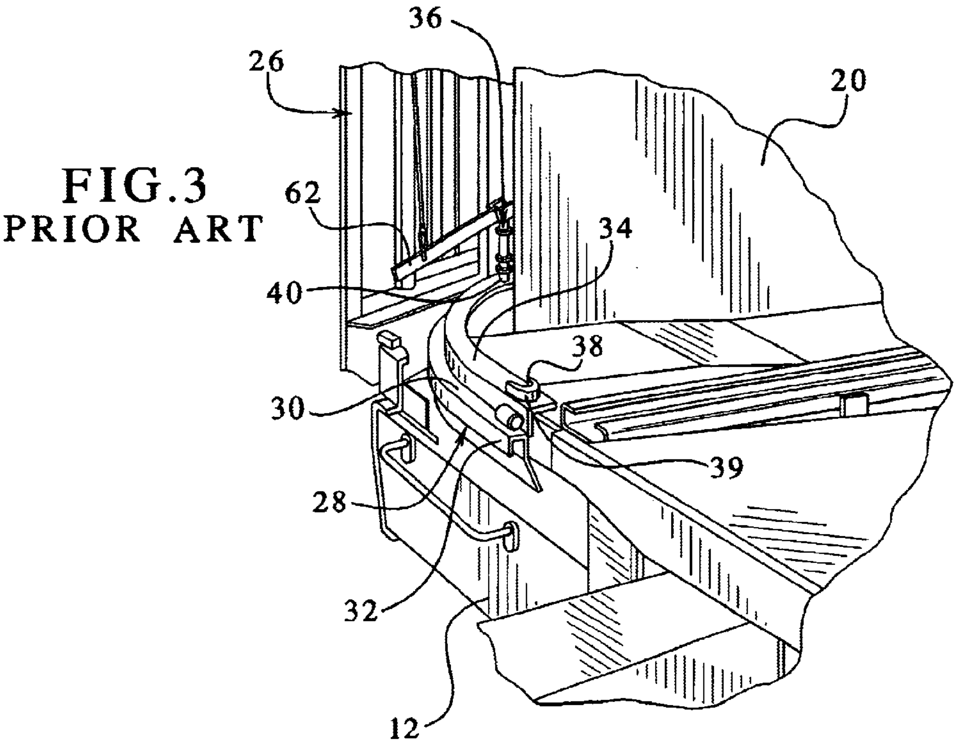
FIG.3 PRIOR ART
FIG. 3 is a fragmentary perspective view of the end of an auto rack car, the left hand door in open position and a conventional lower door lock for the left hand door.
Figure 4:
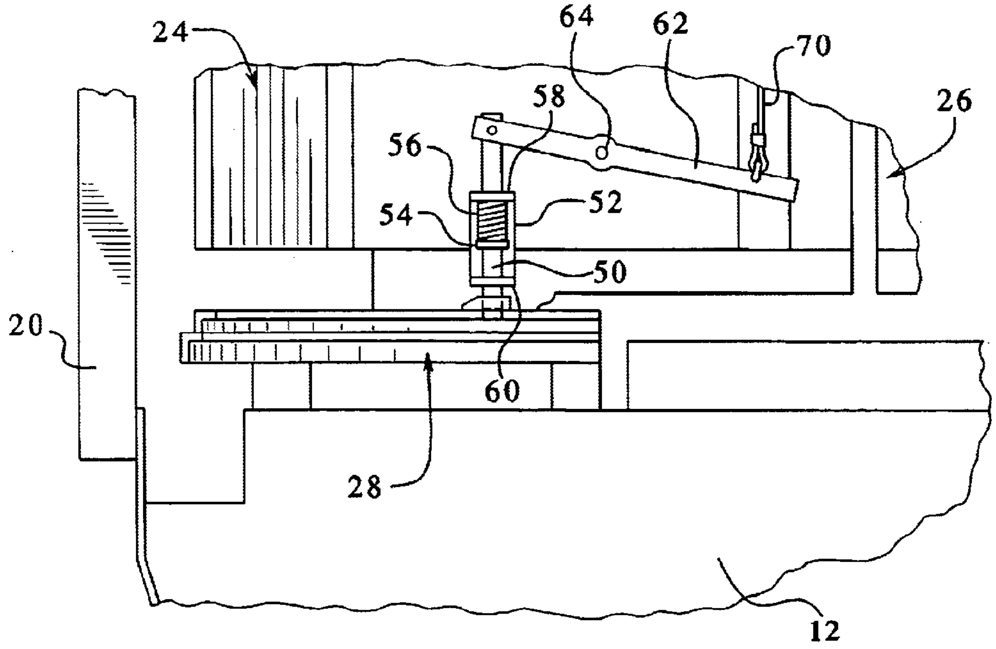
FIG.4 PRIOR ART
FIG. 4 is an enlarged interior plan view of a conventional lower door lock for a right hand door in an auto rack car.

As best illustrated in FIG. 3, the doors 24 and 26 are supported and guided at their bottom ends by lower door tracks 28 mounted on the frame 12 and are guided at their upper ends by upper door tracks (not shown). The steel door track 28 includes a first substantially horizontally disposed door wheel bearing member 30 and a substantially vertically disposed door guide member 32 integrally formed with the outer edge of the bearing member 30. The door track 28 further includes a somewhat offset and higher second horizontally disposed member or ledge 34. The member or ledge 34 includes two spaced apart sockets 38 and 40 for co-acting with a door lock 36 on door 26. Socket 38 co-acts with a door lock 36 when door 26 is in closed position, and socket 40 coacts with a door lock 36 when door 26 is in the open position. The member or ledge 34 also includes a stop 39 associated with each socket 38 and 40 which limits the movement of the door. Stop 39 is illustrated in FIG. 3.

The conventional door locks found in the prior art which are currently being used on railroad cars are illustrated in FIGS. 3 through 8. As specifically illustrated in FIG. 6, each door has a locking assembly 42 which includes a lower door lock 36 and an upper door lock 36*a* interconnected by a cable 70 which causes the door locks 36 and 36*a* to operate in unison to lock and unlock the doors. As illustrated in FIGS. 3, 4, 6 and 7, the lower door lock 36 includes a vertically disposed locking pin 50 mounted in a substantially C-shaped bracket 52 which is mounted on the door. The locking pin 50 is aligned with and received in socket 38 if the door is in the closed position and aligned with and received in socket 40 if the door is in the open position. The door locks 36 include grease caps or grease fittings 63 and 64 on the upper and lower end walls 58 and 60 of the bracket 52 as illustrated in more detail in FIGS. 7 and 8.

The conventional door lock 36 also includes a spring 56 mounted on the locking pin 50 and disposed between the upper and lower end walls 58 and 60 of the bracket 52. The spring 56 is bottomed at one end against the grease cap or fitting 63 on the upper wall 58 and at the other end against a washer 54 which is mounted on the locking pin 50. The spring 56 normally urges the locking pin 50 downwardly.

Figure 2:
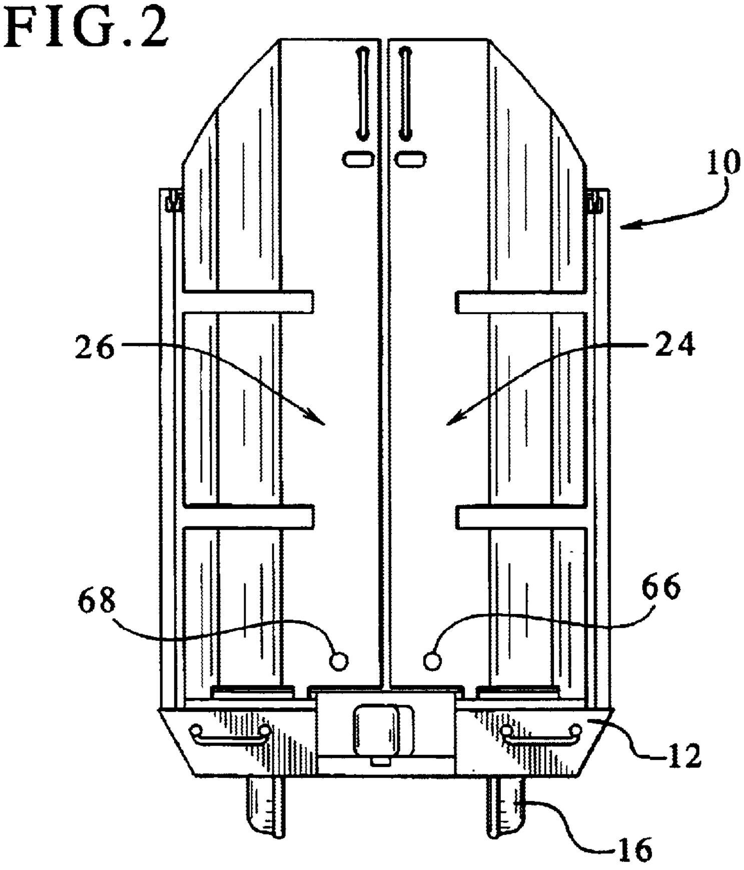
FIG. 2 is an end view of an auto rack railroad car illustrating the doors at one end of the car.

An actuating lever 62 is pivotally mounted on the door and pivotally attached to the top end of the locking pin 50. The actuating lever 62 is rotated or actuated using a key (not shown) which is inserted through keyholes 66 and 68 in the doors 24 and 26 as illustrated in FIG. 2. The rotation of the actuating lever 62 causes an upward force on the locking pin 50 and a downward force on the outer free end of the actuating lever 62 which is connected to the cable 70. When the actuating lever 62 is rotated, the cable 70 connected to the actuating lever 62*a* on the upper door lock 36*a* is likewise actuated to cause the locking pin 50*a* to disengage socket 38*a* on the upper deck or floor of the car to unlock the door and allow it to be moved either from closed position to open position or from open position to closed position as illustrated in FIG. 5.

Figure 5:
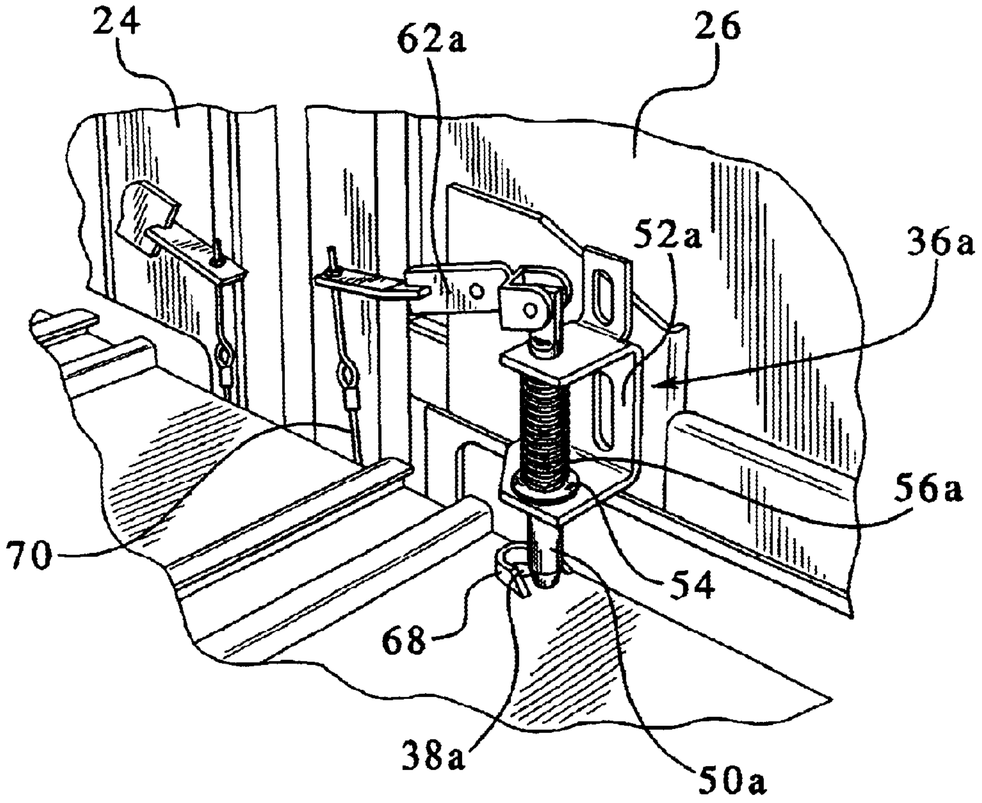
FIG.5 PRIOR ART
FIG. 5 is a fragmentary perspective view of a conventional upper door lock for a left hand door.
Figure 6:
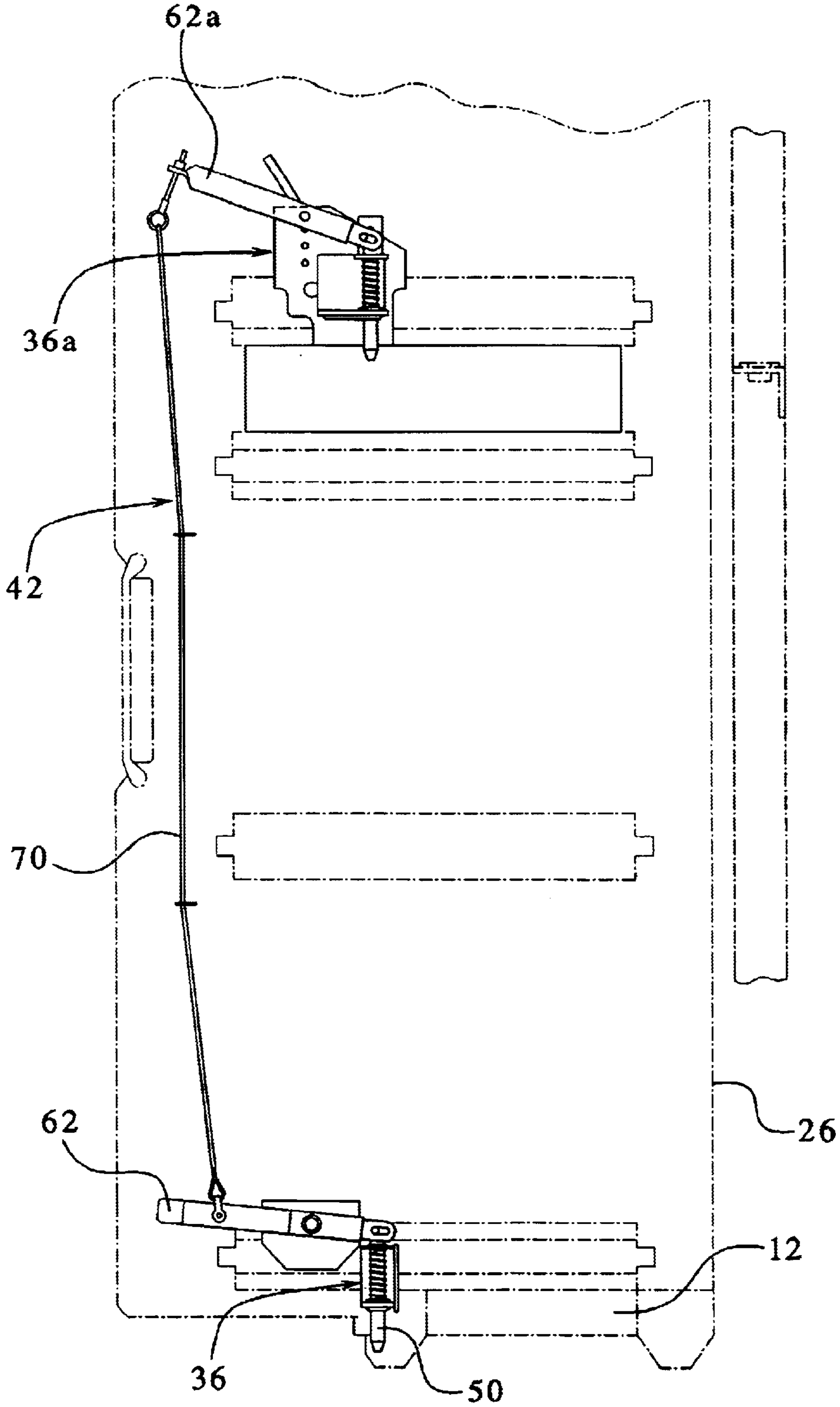
FIG.6 PRIOR ART
FIG. 6 is an interior plan view of a conventional locking assembly for a left hand door including interconnected upper and lower door locks.
Figure 7:
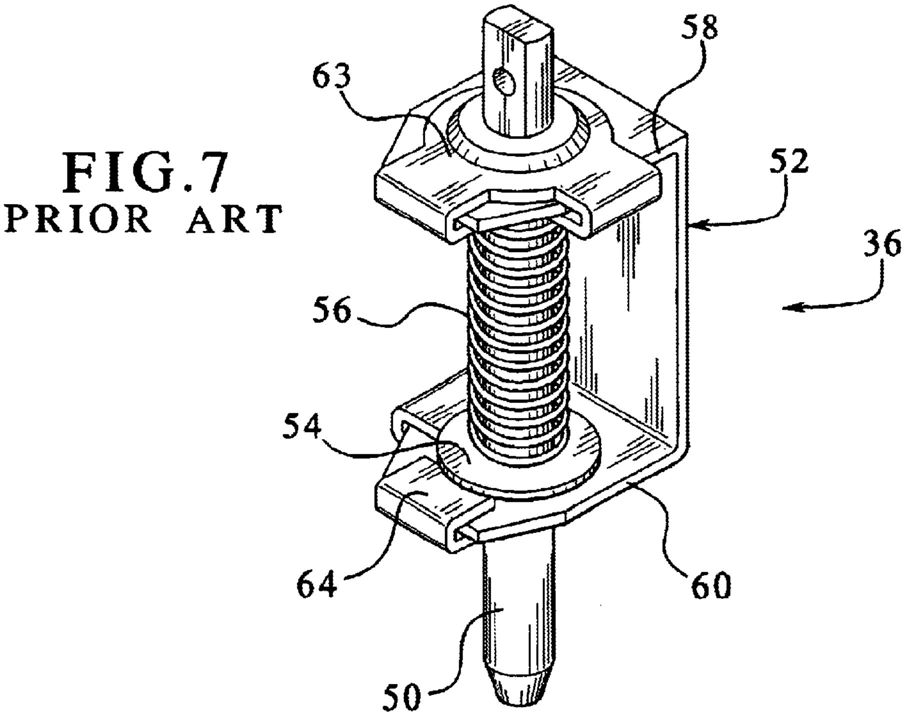
FIG.7 PRIOR ART
FIG. 7 is a perspective view of a conventional lower door lock.
Figure 8:
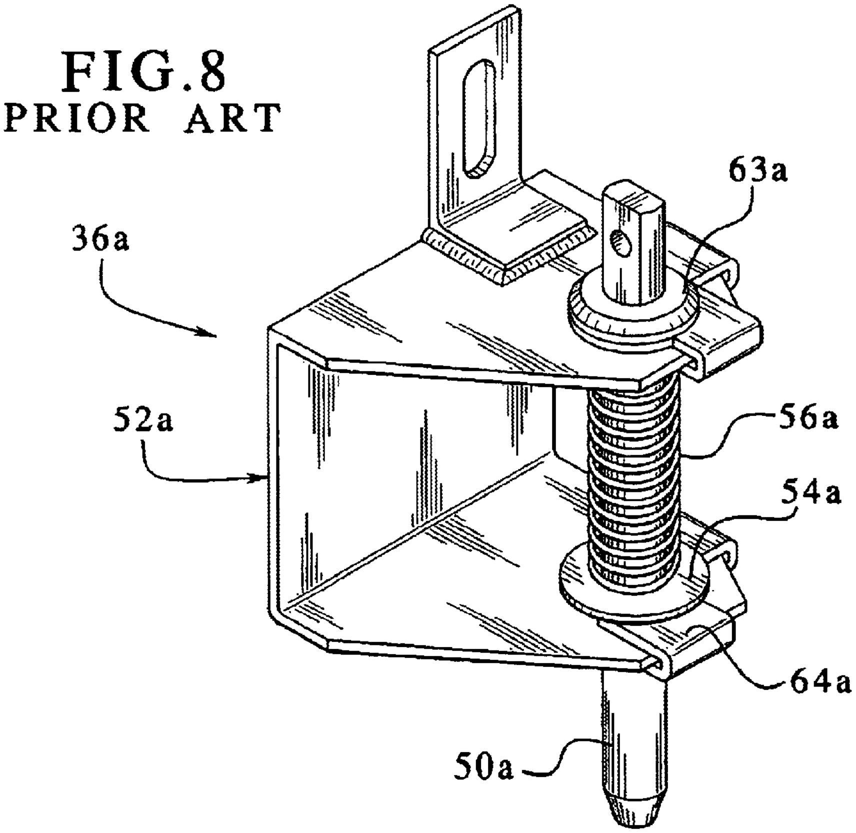
FIG.8 PRIOR ART
FIG. 8 is a perspective view of a conventional upper door lock.

The upper door lock 36*a*, as illustrated in FIGS. 5 and 8, has an alternatively shaped bracket, but generally has identical working parts including a locking pin 50*a*, a spring 56*a*, a washer 54*a* and grease caps or fittings 63*a* and 64*a*. A stop 68 is associated with socket 38*a* in order to assist in stopping the door 26 when it reaches the closed position. The lower end of the locking pin 50*a* is beveled to facilitate entry of the locking pin 50*a* into the socket 38*a*. Release of a force on the actuating lever 62*a* will allow the spring 56*a* to force the locking pin 50*a* downwardly so that it will sit in a socket 38*a* when the locking pin 50*a* is aligned with the socket 38*a* and thereby maintain the door in the open or closed position.

Referring now to FIGS. 9 through 15, one embodiment of a greaseless door lock 100 of the present invention includes a substantially C-shape bracket 102 having a side wall 104 and spaced-apart upper and lower end walls 106 and 108 integrally connected to and extending transversely from the side wall 104. The end walls 106 and 108 include suitably sized aligned circular apertures 110 and 112, defined by inner edges 111 and 113 of end walls 106 and 108, respectively, for receiving a cylindrical locking pin 114. A mounting plate 116 is attached to the bracket 102 and specifically welded to the side wall 104 and end walls 106 and 108 of the bracket 102. The locking pin 114 extends through apertures 110 and 112 in the upper end wall 106 and lower end wall 108 and is secured in the bracket 102 by a spring 118 journaled about the locking pin 114, a disc-shaped washer 120 journaled about the locking pin 114 below the spring 118 and a stop 122 extending transversely through a transverse slot 123 in the locking pin 114. The stop 122 maintains or supports the washer 120, and the spring 118 is buttoned or bottomed against the washer 120 to create the downward force on the locking pin 114 in a conventional manner.

Figure 9:
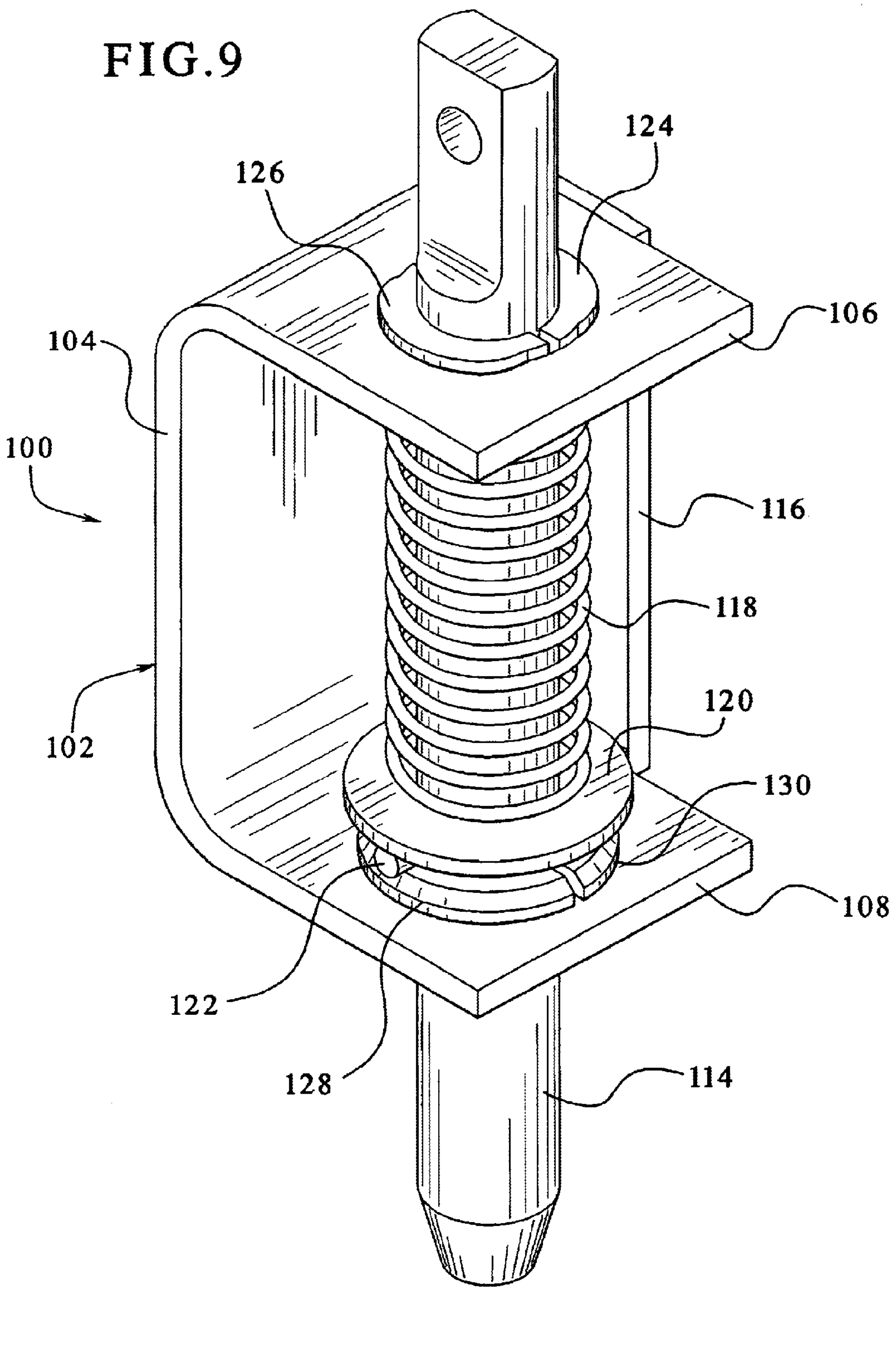
FIG. 9 is a perspective view of a lower greaseless door lock of the present invention.
Figure 10:
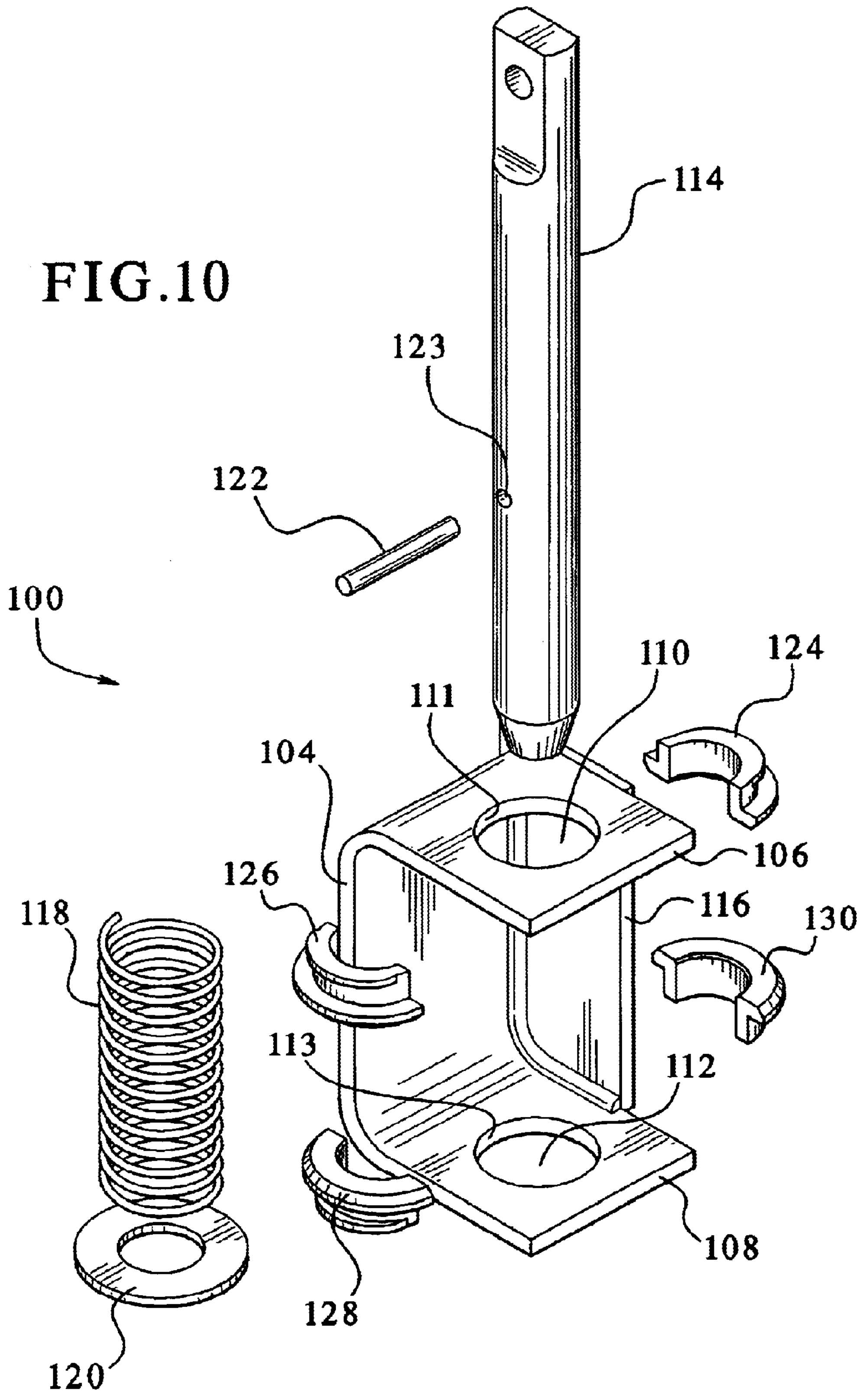
FIG. 10 is an exploded perspective view of the lower greaseless door lock of FIG. 9.

As further shown in FIG. 10, a pair of upper collars, bearing members or bushings 124 and 126 are positioned in the aperture 110 between the outer circumference of locking pin 114 and the inner edge 111 of the upper end wall 106 which defines the aperture 110. A pair of lower collars, bearing members or bushings 128 and 130 are positioned in the aperture between the outer circumference of locking pin 114 and the inner edge 113 of the lower end wall 108 which defines the aperture 112. As illustrated in FIG. 9, the locking pin 114 is suitably sized to maintain the semi-cylindrical bushings 124, 126, 128 and 130 in place and prevent the displacement of the bushings. Bushings 124, 126, 128 and 130 are preferably identical. For purposes of this application, bushing 130 is described in greater detail below.

Figure 11:
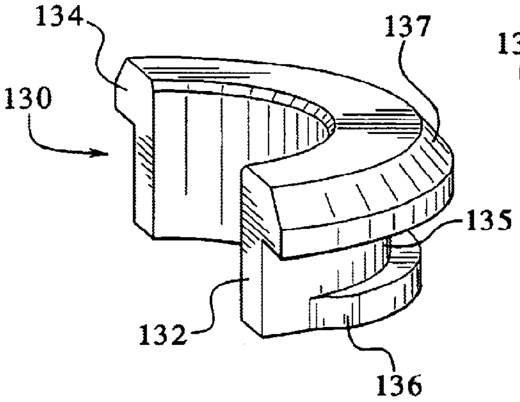
FIG. 11 is an enlarged perspective view of a semi-cylindrical collar, bearing member or bushing of the greaseless door lock of the present invention.
Figure 12:
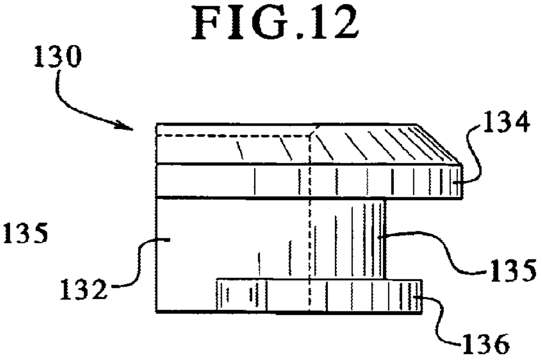
FIG. 12 is a side plan view of a semi-cylindrical collar, bearing member or bushing of the greaseless door lock of the present invention.
Figure 13:
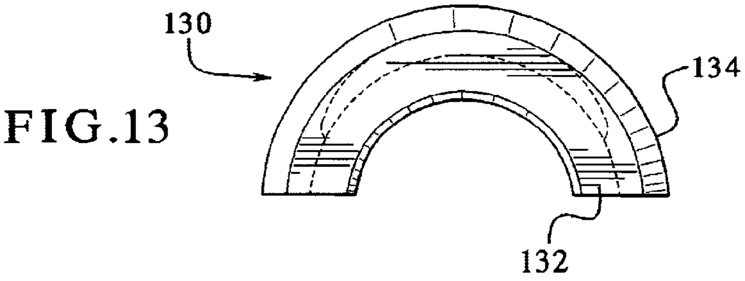
FIG. 13 is a top plan view of a semi-cylindrical collar, bearing member or bushing of the greaseless door lock of the present invention.
Figure 14:
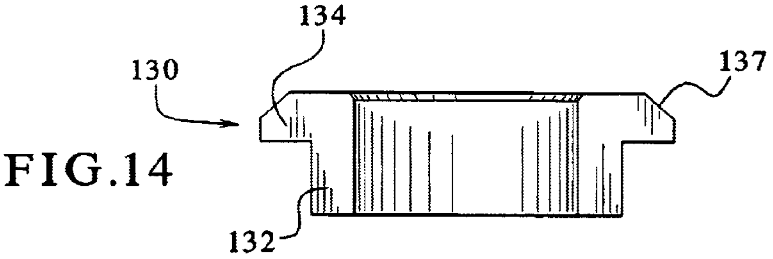
FIG. 14 is a plan view of the interior of a semi-cylindrical collar, bearing member or bushing of the greaseless door lock of the present invention.
Figure 15:
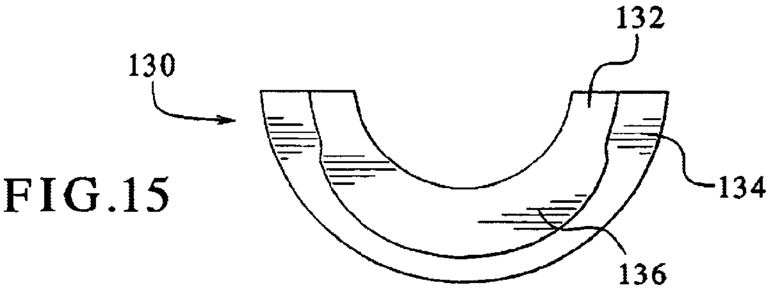
FIG. 15 is a bottom plan view of a semi-cylindrical collar, bearing member or bushing of the greaseless door lock of the present invention.

As further illustrated in FIGS. 11 through 15, bushing 130 includes a semi-clyindrical body 132, a semi-cylindrical first or upper flange 134 extending transversely from the entire first or upper end of the semi-cylindrical body 132 and a semi-cylindrical second or lower flange 136 extending transversely from a portion of the second or lower end of the semi-cylindrical body 132. The upper flange 134 may include a beveled edge 137. The upper and lower flanges 134 and 136 define a semi-circular slot 135. Slot 135 has a height which is slightly greater than the thickness of upper and lower end walls 106 and 108 so that bushing 130 can receive the inner edges 111 and 113 of end walls 106 or 108 which define the apertures 110 and 112, respectively. The flanges 134 and 136 engage the top and bottom surfaces of the end walls 106 or 108 of the bracket as illustrated in FIGS. 9 through 11.

More specifically, the bushings 128 and 130 on lower end wall 108 are preferably mounted with the first or upper flanges 134 adjacent to or engaging the top surface of the end wall 108 as illustrated in FIGS. 9 and 10, and with the second or lower flanges 136 adjacent to or engaging the bottom surface of the end wall 108 to form a snug fit. The bushings 124 and 126 are mounted with the second or lower flanges adjacent or engaging the top surface of the end wall 106, and with the first or upper flanges 134 adjacent to or engaging the bottom surface of the end wall 106. This arrangement provides the greatest purchase area for the top of the spring 118 to engage the first or upper flanges 134 of bushings 124 and 126 and for the stop 122 to engage the first or upper flanges 134 of bushings 128 and 130. Preferably, as illustrated in FIGS. 9 to 15 the first or upper flanges are larger than the second or lower flanges in the bushings of the present invention to facilitate ease of mounting the bushings in the aperture as will be appreciated by one of ordinary skill in the art.

The C-shaped bracket 102 is preferably made of a suitable metal such as steel, although it could be made of other suitable materials such as plastics, ceramics or composites. To form the steel C-shaped bracket 102, a suitably sized blank steel plate is laser cut, burned or die cut to the desired profile. The appropriate apertures are punched at the desired locations in the plate to create apertures 110 and 112. Thereafter, the plate is bent in a conventional manner using progressive dies to form the upper end wall 106, the side wall 104 and the lower end wall 108. The mounting plate 116 is then welded to the bracket 102. Prior to installation, the C-shaped bracket 102 is preferably primed and painted with a suitable rust preventing primer and paint. It should be appreciated that the C-shaped bracket of the greaseless door lock of the present invention could be formed in any suitable alternative manner.

The bushings 124,126, 128, and 130 are preferably injection molded from a moly disulfide filled nylon, although they could be made in other suitable manners and from other suitable materials such as delrin, urethane, ultra-high molecular weight polyethylene, manganese, bronze and ceramics. The bushings 124, 126, 128, and 130 preferably have a low coefficient of friction to steel, dry self-lubricating and non-hygroscopic characteristics, a high compressive strength and a high resistance to wear. Although the bushings 124, 126, 128, and 130 are usually protected from direct sunlight, the bushings 124, 126, 128, and 130 could include an ultraviolet inhibitor.

Figure 16:
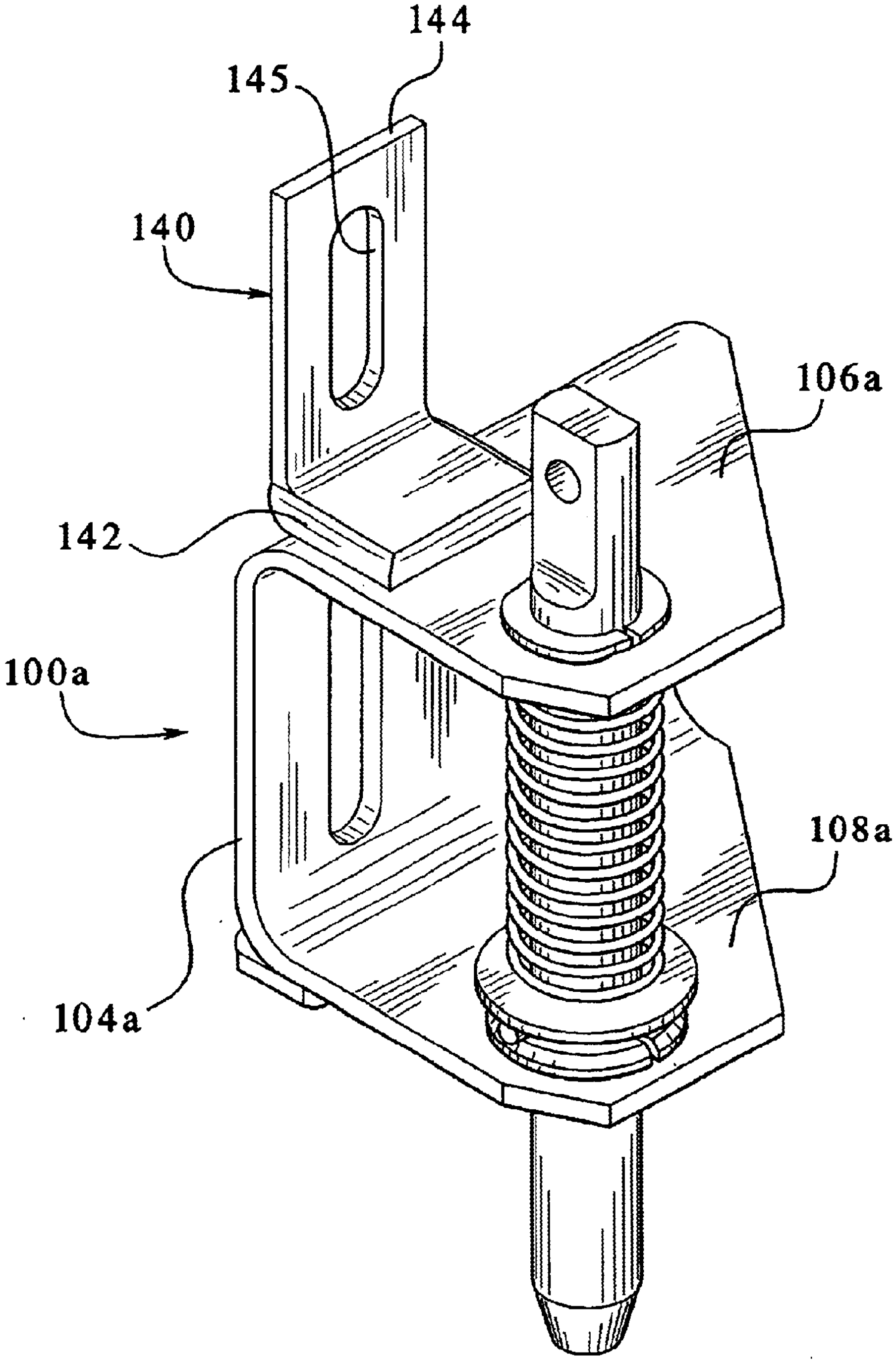
FIG. 16 is a perspective view of an upper greaseless door lock of the present invention.
Figure 17:
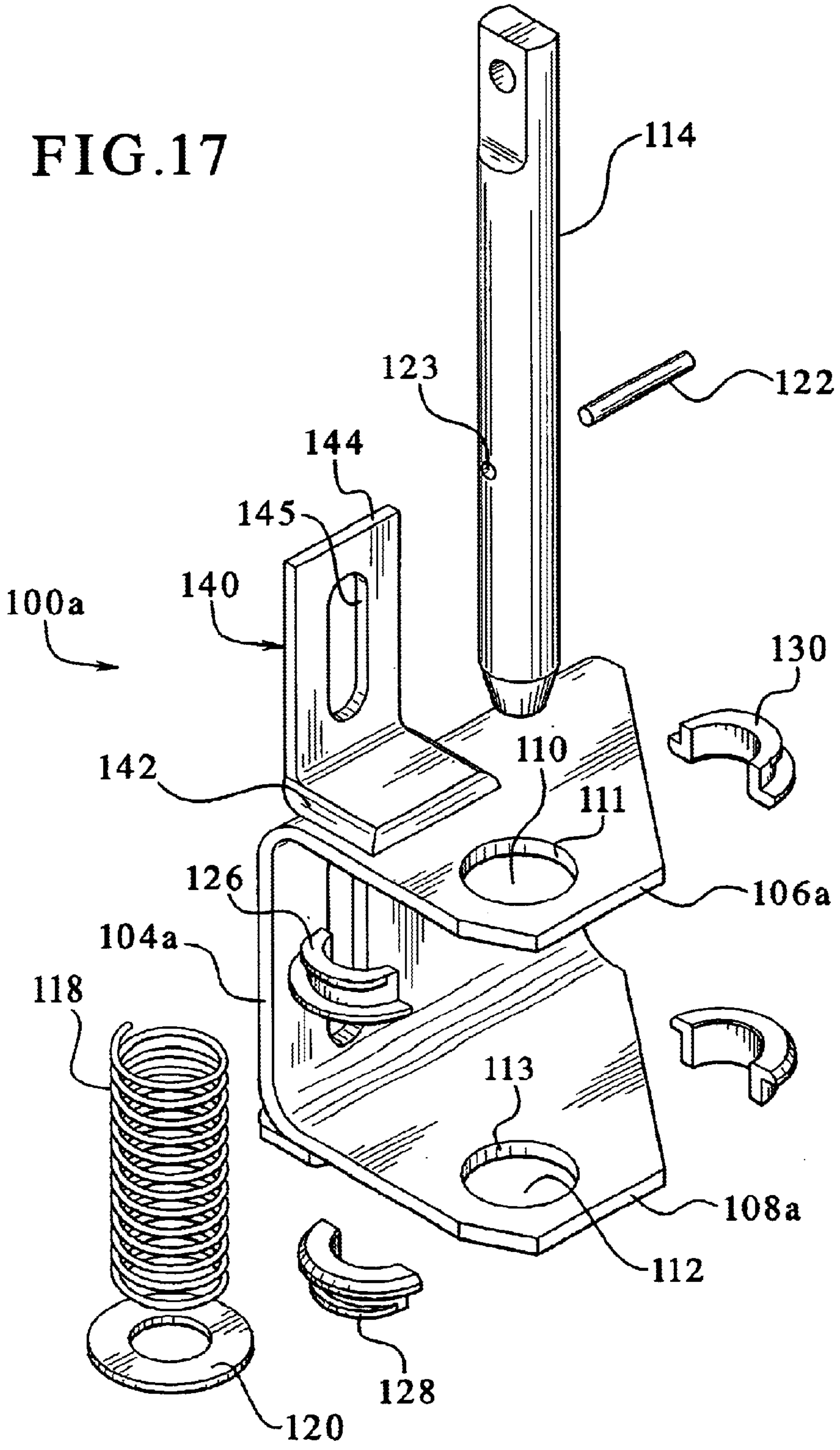
FIG. 17 is an exploded perspective view of the upper greaseless lock of FIG. 16.

An upper greaseless door lock **100*a* of the present invention is illustrated in FIGS. 16 and 17. The upper greaseless door lock 100*a* is substantially the same as greaseless door lock 100 except that its side wall 104*a* has a relatively larger surface area than side wall 104, and the upper and lower end walls 106*a* and 108*a* of door lock 100*a* have relatively larger surface areas than upper and lower end walls 106 and 108. The upper greaseless door lock 100*a* includes an L-shaped mounting bracket 140 attached to the top of upper wall 106*a*. Mounting bracket 140 has a first plate 142 rigidly connected to the upper end wall 106*a* and a second plate 144 adapted for mounting door lock 100*a* to the door. To facilitate attachment of upper greaseless door lock 100*a* to the door, the second plate 144 includes an elongated slot 145 as shown in FIG. 16. The bushing 124, 126, 128 and 130 are preferably employed in the upper greaseless door lock 100*a* as described above in regard to the greaseless door lock 100 as illustrated in FIG. 17**.

Figure 18:
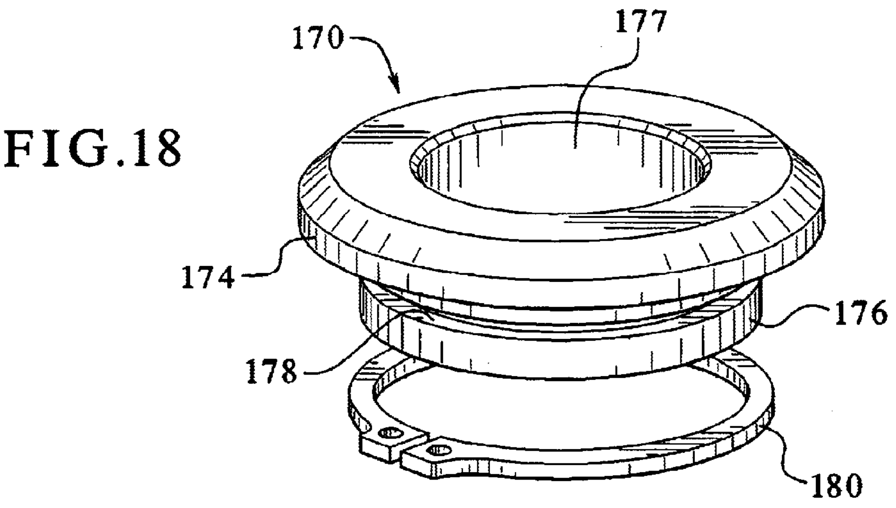
FIG. 18 is an enlarged perspective view of an alternative cylindrical collar, bearing member or bushing and locking clip of the present invention.
Figure 19:
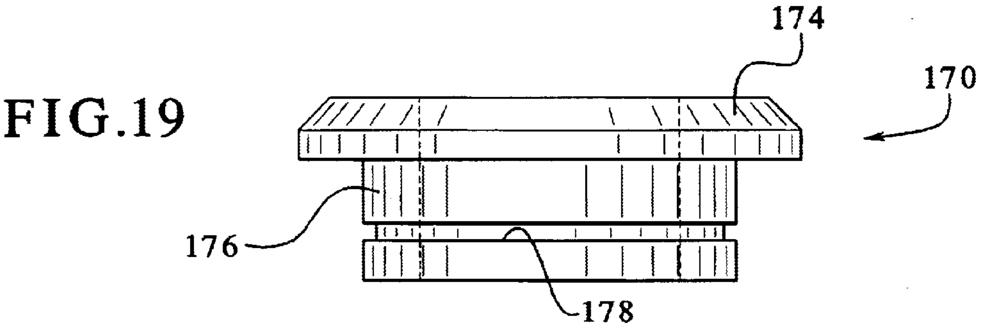
FIG. 19 is a side plan view of the alternative cylindrical collar, bearing or bushing member of FIG. 18.
Figure 20:
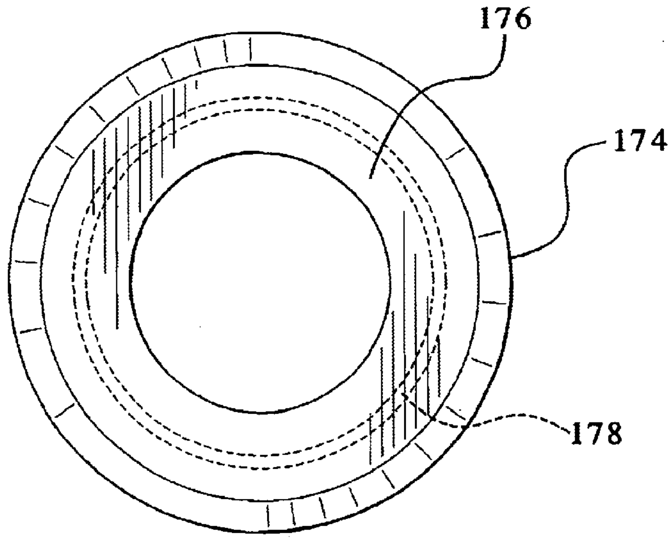
FIG. 20 is a top plan view of the alternative cylindrical collar, bearing member or bushing of FIG. 18.

An alternative embodiment of the collars, bearing members or bushings of the greaseless door lock of the present invention is illustrated in FIGS. 18 through 20 and generally indicated by numeral 170. The bushing 170 is a one-piece cylindrical member which includes a cylindrical body 176, which defines an aperture 177 at least slightly larger than the locking pin, a flange 174 which extends transversely or outwardly from the entire first or upper end of the body 176, and a cylindrical ring slot 178 formed in the body 176 below the flange 174. The distance between the bottom of flange 174 and the top of cylindrical ring slot 178 is slightly greater than the thickness of the walls 106 and 108 such that the end walls 106 and 108 do not cover ring slot 178 when the bushings are inserted in aperatures 110 and 112.

The ring slot 178 is adapted to receive a snap ring or locking clip 180. The snap ring 180 is placed in the ring slot 178 to securely maintain the bushing 170 in the apertures in walls 110 and 112. The bushing 170 is made preferably from the same material and in the same manner as bushing 130. Snap ring 180 is commercially available in a variety of materials, though the preferable material is stainless steel to prevent rusting.

Although not shown, one bushing is preferably mounted in the aperature 112 in the lower end wall 108 with the flange 174 adjacent to or engaging the top surface of the end wall 108, and with one snap ring 180 engaging or adjacent to the bottom surface of the end wall 108. Although not shown, another bushing 170 is preferably mounted in the aperature 110 in the upper end wall 106 with the flange 174 adjacent or engaging the bottom surface of the end wall 106, and with another snap ring 180 engaging or adjacent to the top surface of the end wall 106.

It will be understood that modifications and variations may be effected without departing from the scope of the novel concepts of the present invention, and it is understood that this application is to be limited only by the scope of the claims.

The invention is hereby claimed as follows:

1. In a railroad car having a door and a door lock for the door on the railroad car, said door lock comprising:

a locking pin;

a bracket having a side wall and spaced-apart end walls connected to and transversely extending from said side wall, said end walls defining aligned apertures for receiving said locking pin; and at least one bushing mounted in each aperture, wherein each bushing includes a pair of semi-cylindrical bodies each having a first end and a second end, a first flange extending transversely from said first end, and a second flange extending transversely from said second end, wherein said first flange and said second flange of each body define a slot adapted to receive one of the end walls and wherein the first flange is larger than the second flange, whereby the bushings prevent the locking pin from directly contacting the end walls of the bracket and eliminate the need to lubricate the door lock.

2. The railroad car of claim 1, wherein the first flange transversely extends from the entire semi-cylindrical first end of the semi-cylindrical body.

3. The railroad car of claim 2, wherein the second flange transversely extends only from a portion of the second end of the semi-cylindrical body.

4. The railroad car of claim 3, wherein said bushings are made from a polymer.

5. The railroad car of claim 4, wherein said bushings are made of a moly disulfide filled nylon material.

6. The railroad car of claim 1, wherein the end walls include top and bottom surfaces, and wherein the first flanges of one pair of bodies are mounted adjacent to the top surface of one of the end walls and the first flanges of another pair of bodies are mounted adjacent to the bottom surface of the other end wall.

7. The railroad car of claim 1, wherein said bushings are made from a polymer.

8. The railroad car of claim 7, wherein said bushings are made of a moly disulfide filled nylon material.

9. In a railroad car having a door and a door lock for the door on the railroad car, wherein the door lock includes a substantially C-shaped bracket having a side wall and spaced apart end walls connected to said side wall, said end walls having inner edges which define aligned apertures for receiving a locking pin, the improvement in a bushing mounted in each aperture for reducing the friction between said locking pin and said inner edges of the end walls without using a lubricant, said bushing comprising at least two bodies, a first flange extending from each body and means extending from each body for co-acting with the first flange to secure the body in the aperture, wherein said first flange is larger than said extending means.

10. The railroad car of claim 9, wherein said securing means includes a second flange extending from the body.

11. The railroad car of claim 9, wherein each said body is semi-cylindrical and two bodies are mounted in each aperture.

12. The railroad car of claim 9, wherein said bushing is made of a dry self-lubricating material having non-hygroscopic characteristics, a low coefficient of friction, a high compressive strength and a high resistance to wear.

13. In a railroad car having a door and a door lock for the door on the railroad car, said door lock comprising:

a locking pin;

a bracket having a side wall and spaced-apart end walls connected to and transversely extending from said side wall, said end walls defining aligned apertures for receiving said locking pin; and a bushing mounted in each aperture, wherein each bushing includes at least two-co-acting bodies each having a first end and a second end, a first flange extending transversely from said first end, and a second flange extending transversely from said second end, wherein the first flange is larger than the second flange, whereby the bushings co-acting prevent the locking pin from directly contacting the end walls of the bracket and eliminate the need to lubricate the door lock.

14. The railroad car of claim 13, wherein said first flange and said second flange define a slot adapted to receive one of the end walls.

15. The railroad car of claim 13, wherein the first flange transversely extends from the entire first end of the body.

16. In a railroad car having a door and a door lock for the door on the railroad car, said door lock comprising:

a locking pin;

a bracket having a side wall and spaced-apart end walls connected to and transversely extending from said side wall, said end walls defining aligned apertures for receiving said locking pin; and a bushing mounted in each aperture, wherein each bushing includes at least two co-acting bodies each having a first end and a second end, a first flange extending transversely from said first end, and a second flange extending transversely from said second end, wherein the second flange transversely extends from only a portion of the second end of the body, whereby the bushings co-acting prevent the locking pin from directly contacting the end walls of the bracket and eliminate the need to lubricate the door lock.

17. The railroad car of claim 13, wherein said bushings are made of a moly disulfide filled nylon material.

18. The railroad car of claim 13, wherein said bushings are made from a polymer.

19. In a railroad car having a door, a door lock and a bushing for the door lock on the railroad car wherein the door lock includes a locking pin, a substantially C-shaped bracket having a side wall and spaced-apart end walls connected to said side wall, said end walls having inner edges which define aligned apertures for receiving said locking pin, said bushing comprising:

at least two self-lubricating bodies each having a first end and a second end;

a first flange extending transversely from said first end of each body; and a second flange extending transversely from only a portion of said second end of each body, said first flange being larger than said second flange said first flange and said second flange defining a slot adapted to receive the inner edge of one of said end walls when said body is mounted in said aperture defined by said inner edge.

20. The ralroad car of claim 19, wherein said bushing is made from one of a group of materials consisting of a polymer, manganese, bronze, ceramics, UHMW polyethylene, delrin and urethane.

21. The railroad car of claim 19, wherein said bushing is made of a moly disulfide filled nylon material.

22. In a railroad car having a door, a door lock for the door on the railroad car, said door lock comprising:

a locking pin;

a bracket having a side wall and spaced-apart end walls connected to and transversely extending from said side wall, said end walls defining aligned apertures for receiving said locking pin; and a bushing including a pair of co-acting bodies mounted in spaced-apart relation in each aperture, wherein each body includes a semi-cylindrical body having a first end and a second end, a first flange extending transversely from said first end, and a second flange extending transversely from said second end, wherein the first flange is larger than the second flange;

whereby the bushings prevent the locking pin from directly contacting the end walls of the bracket and eliminate the need to lubricate the door lock.

23. The railroad car of claim 22, wherein the first flange transversely extends from the entire first end of the semi-cylindrical body.

24. The railroad car of claim 22, wherein the second flange transversely extends from a portion of the second end of the semi-cylindrical body.

25. The railroad car of claim 22, wherein said bushings are made from a polymer.

26. Th railroad car of claim 22, wherein said bushings are made of a moly disulfide filled nylon material.

* * * * *